United States Patent
Park et al.

(10) Patent No.: US 7,174,076 B2
(45) Date of Patent: Feb. 6, 2007

(54) OPTICAL FIBER CABLE SUITABLE FOR INSTALLATION USING AN AIR-BLOWN INSTALLATION METHOD

(75) Inventors: Hoon-Soo Park, Gwangmyeong-si (KR); Joong-Jin Hwang, Gumi-si (KR); Seung-Hyun Moon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 10/902,536

(22) Filed: Jul. 29, 2004

(65) Prior Publication Data

US 2005/0094953 A1    May 5, 2005

(30) Foreign Application Priority Data

Nov. 5, 2003    (KR)    .................... 10-2003-0078136

(51) Int. Cl.
*G02B 6/44*    (2006.01)

(52) U.S. Cl. .............. 385/103; 385/100; 385/102; 385/104; 385/109; 385/112

(58) Field of Classification Search .............. 385/100, 385/102–104, 109, 112
See application file for complete search history.

(56) References Cited

U.S. PATENT DOCUMENTS

| | | | | |
|---|---|---|---|---|
| 5,542,020 A | * | 7/1996 | Horska | 385/112 |
| 6,853,781 B2 | * | 2/2005 | Chastain et al. | 385/112 |
| 6,901,191 B2 | * | 5/2005 | Hurley et al. | 385/109 |
| 2002/0009272 A1 | * | 1/2002 | Parris | 385/109 |
| 2002/0085821 A1 | * | 7/2002 | Bourget | 385/113 |
| 2002/0122640 A1 | * | 9/2002 | Strong et al. | 385/114 |
| 2004/0033036 A1 | * | 2/2004 | Park et al. | 385/113 |
| 2004/0252954 A1 | * | 12/2004 | Ginocchio et al. | 385/100 |

* cited by examiner

*Primary Examiner*—Frank G. Font
*Assistant Examiner*—Michael P. Mooney
(74) *Attorney, Agent, or Firm*—CHA Reiter, L.L.C.

(57) ABSTRACT

An optical fiber cable suitable installation using an air-blown method is disclosed. The optical fiber cable has a center tensile member located at a center of the optical fiber cable to provide tension-resistant force, at least three loose tubes each of which includes at least one optical signal transmitting medium, and located to surround a peripheral portion of the center tensile member, a binder surrounding the loose tubes to maintain an alignment pattern of the loose tubes, and a sheath located at an outermost portion of the optical fiber cable. The optical fiber cable has a polygonal sectional shape having smooth edges.

6 Claims, 2 Drawing Sheets

OPTICAL FIBER CABLE SUITABLE FOR INSTALLATION USING AN AIR-BLOWN INSTALLATION METHOD

CLAIM OF PRIORITY

This application claims priority to an application entitled "Cable for air-blown installation," filed with the Korean Intellectual Property Office on Nov. 5, 2003 and assigned Serial No. 2003-78136, the contents of which are hereby incorporated by reference.

BACKGROUND OF THE INVENTION

1. Field of the Invention

The present invention relates to an optical fiber cable, and more particularly to an optical fiber cable installed in a duct using an air-blown installation method.

2. Description of the Related Art

In general, in order to install an optical fiber cable in a duct, methods for pushing or pulling the optical fiber cable into/from a predetermined end of the duct have been used. However, such installing methods may apply excessive stress to the optical fiber cable causing damage. Particularly, in the case of installing the optical fiber cable in a duct, an optical fiber accommodated in an optical fiber cable may be affected from such stress, thereby forming a minute curvature on a surface of the optical fiber cable while applying residual stress to the surface of the optical fiber cable. Accordingly, the optical fiber cable installed through such installation methods must include various tensile members in order to improve tension-resistant force.

As a replacement for such installation methods, an air-blown installation, which installs the optical fiber cable by blowing air into the duct, has been used. The air-blown installation method has advantages in that stress is rarely applied to an internal optical signal transmitting medium. This allows for the number of tensile members of the optical fiber cable to be reduced. The optical fiber cable installed through the air-blown installation method, however, must have a smaller diameter and a lighter weight than those of the optical fiber cable installed through the other installation method described above. In addition, the optical fiber cable must be easily moved when air is applied thereto.

An optical fiber cable disclosed in U.S. Pat. No. 5,389,442, which is issued to Candido J. Arroyo and entitled "Water blocking strength members", includes a plurality of tubes and a plurality of auxiliary waterproof members interposed between the tubes. The above tubes and auxiliary waterproof members are surrounded by two layers of rigid yarn. These two layers are surrounded by a sheath. The optical fiber cable maintains a circular sectional shape due to internal parts thereof even if the thickness of the sheath becomes thin.

Conventional optical fiber cables capable of being installed by an air-blown installation method must have an outer diameter that is less than 80 percent of an inner diameter of a small duct. This is therefore a design limitation for the optical fiber cables. However, if the optical fiber cable using with the air-blown installation method is designed identically to the optical fiber cable for the tension installation method, it is difficult to obtain a suitable outer diameter of the optical fiber cable for the air-blown installation. Also, an improper design may be created in view of maintain tension and waterproof characteristics.

Accordingly, an improved optical fiber cable for the air-blown installation is needed in the art.

SUMMARY OF THE INVENTION

One aspect of the present invention is an optical fiber cable having an external appearance adapted for an air-blown installation.

Another aspect of the present invention is an optical fiber cable having a size suitable for air-blown installation methods.

Another aspect of the present invention is an optical fiber cable having a lighter weight with a reduced number of components as compared to conventional optical fiber cables while also helping prevent improper design for the optical fiber cable.

One embodiment of the present invention is directed to an optical fiber cable including a center tensile member located at a center of the optical fiber cable in order to provide tension-resistant force, at least three loose tubes each of which includes at least one optical signal transmitting medium, and located to surround a peripheral portion of the center tensile member; a binder surrounding the loose tubes so as to maintain an alignment pattern of the loose tubes, and a sheath located at an outermost portion of the optical fiber cable. The optical fiber cable has a polygonal sectional shape having smooth edges.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
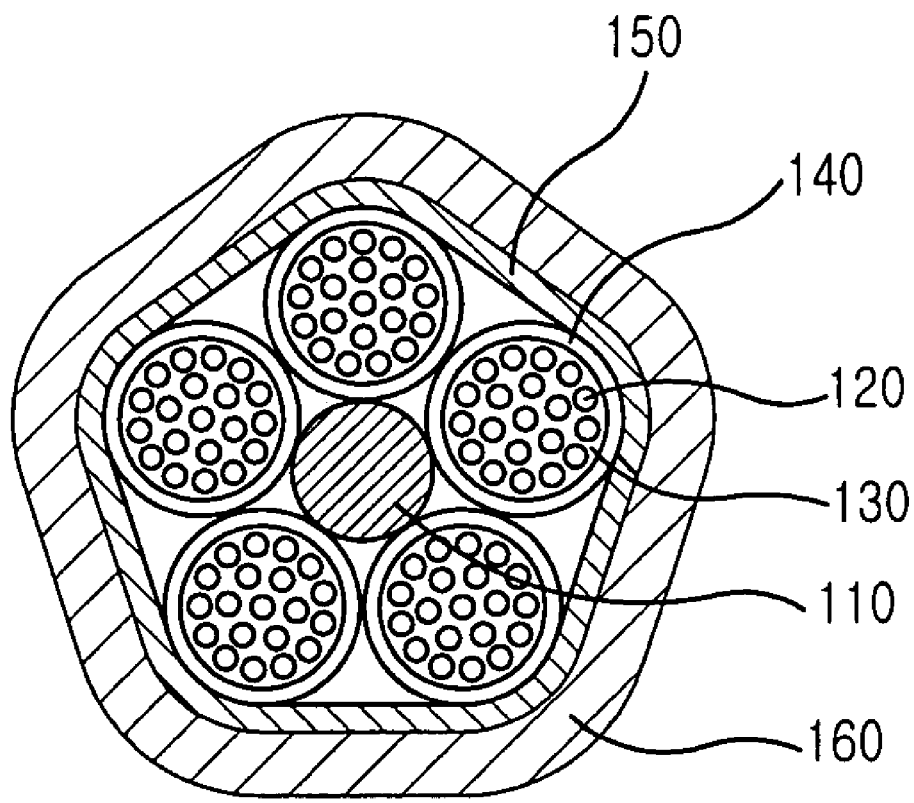
FIG. 1 is a sectional view showing a construction of an optical fiber cable for an air-blown installation according to a preferred embodiment of the present invention.

FIG. 1 is a sectional view showing an optical fiber cable according to a first embodiment of the present invention. As shown, an optical fiber cable 100 includes a center tensile member 110, a plurality of optical fibers 120, a plurality of loose tubes 140, a binder 150, and a sheath 160.

The center tensile member 110 provides tension-resistant force to the optical fiber cable 100, and is located substantially at a center of the optical fiber cable 100. The center tensile member 110 may be made of FRP (Fiberglass Reinforced Plastic).

The plurality of loose tubes 140 are aligned in such a manner that they surround the center tensile member 110, and have at least one optical fiber 120 therein. The loose tubes 140 can be located at a peripheral of the center tensile member 110 as a linear pattern, a helical pattern, or an S-Z pattern. Such alignment patterns have been already known in the art. For example, the S-Z pattern is particularly described in U.S. Pat. No. 4,828,352, which is issued to Heinrich A. Kraft, and entitled "S-Z STRANDED OPTICAL CABLE".

Also, a hollow space 130 of the loose tubes 140 can be filled with jelly compound, and the jelly compound protects the optic fibers 220 from external shock and absorbs moisture penetrated into an interior of the optical fiber 120. For example, each of the loose tubes 140 has a diameter in a range of 1.6 mm to 2.0 mm. In a case in which the loose tubes 140 are aligned in the helical pattern or the S-Z pattern, a total pitch thereof is less than 150 mm. In this case, the sheath 160 has a thickness identical to or less than 1.0 mm.

The binder 150 surrounds the loose tubes 140 to maintain the alignment of the loose tubes 140. The binder 150 surrounds the loose tubes 140 in a helical pattern, and has a total pitch identical to or less than 150 mm. The binder 150 may include, for example, a tape, a polyester yarn, or an aramid yarn. When using the aramid yarn, a waterproof aramid yarn is used in order to achieve a waterproof function, or a rigid aramid yarn in order to enhance strength, or combination thereof will be used in order to ensure the waterproof function and strength improvement.

The sheath 160 is located at an outermost part of the optical fiber cable 100. The sheath 160 may include high-polymer compounds such as PVC, PE, hytrel, nylon and polypropylene. The sheath 160 may be manufactured by an extrusion process. In addition, the sheath 160 can include a rip cord (not shown) adjacent to an inner wall thereof to easily peel off the sheath 160. For example, the sheath 160 may have a thickness identical to or less than 1.0 mm.

Figure 2:
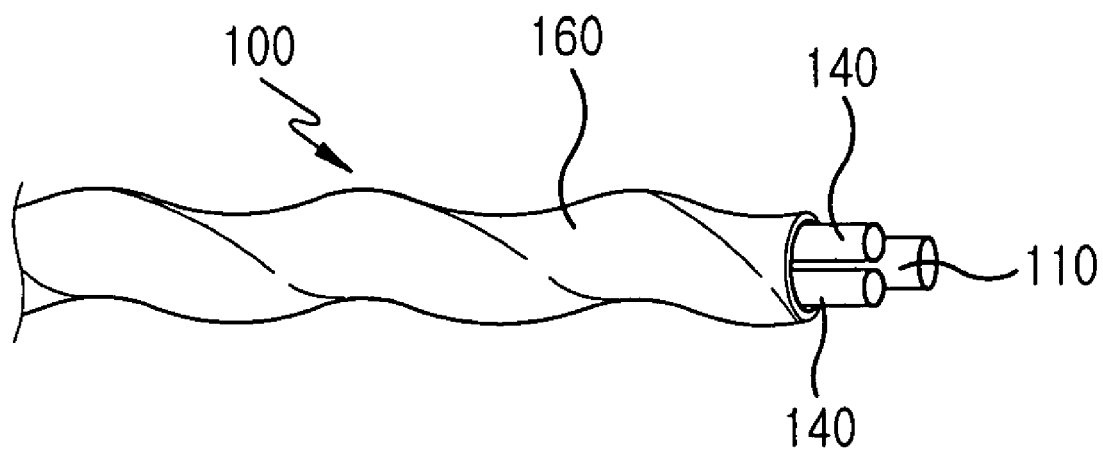
FIG. 2 is a perspective view schematically showing an optical fiber cable, in which loose tubes shown in FIG. 1 are helically aligned.

The optical fiber cable 100 may have a polygonal sectional shape, in which edges thereof are smoothly formed. For example, FIG. 1 shows an embodiment using a pentagonal sectional shape. It should be understood that other polygonal sectional shapes may be used, e.g., triangular, rectangular and octagonal. FIG. 2 shows a schematic perspective view of the optical fiber cable 100 in a case in which the loose tubes 140 are aligned in the helical form. The optical fiber cable 100 for the air-blown installation requires a relatively small tensile force as compared with the optical fiber cable for the tension installation method. This allows the optical fiber cable 100 to be suitable for air blown installation even if it has no auxiliary tensile member.

In this embodiment, because the section shape of the optical fiber cable 100 forms a pentagonal shape having smooth edges, the frictional coefficient of the optical fiber cable 100 with respect to a cable duct is small, and therefore, the optical fiber cable 100 is easily moved when air is applied to the optical fiber cable 100.

Table 1 shows a test result representing frictional coefficient of optical fiber cables with respect to cable duct according to sectional shapes of the cable.

Two kinds of cable ducts manufactured by different companies are used for the test. The optical fiber cables have the same weight and the same circular sectional shapes.

TABLE 1

| Sectional shape of cable | Frictional coefficient in duct A | Frictional coefficient in duct B |
| --- | --- | --- |
| Circular shape | 0.146 | 0.096 |
| Pentagonal shape having smooth edges | 0.126 | 0.078 |

As described above, as the optical fiber cable for an air-blown installation according to one embodiment of the present invention has a pentagonal sectional shape having smooth edges, frictional coefficient between the optical fiber cable for an air-blown installation and the duct is reduced. This allows the optical fiber cable to be easily moved when air is applied thereto.

Also, the optical fiber cable for the air-blown installation according to other embodiments of the present invention may have a smaller size and/or a lighter weight and/or may have a reduced number of internal components as compared to conventional optical fiber cables.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical fiber cable comprising:
    a tensile member located substantially at a center of the optical fiber cable;
    a plurality of tubes each of which includes at least one optical signal transmitting medium, and located around a peripheral portion of the tensile member;
    a binder surrounding the plurality of tubes to maintain an alignment pattern of the tubes; and
    a sheath located at an outermost portion of the optical fiber cable, wherein the optical fiber cable has a polygonal sectional shape and a total pitch identical to or less than 80 mm.

2. The optical fiber cable according to claim 1, wherein the polygonal sectional shape has smooth edges.

3. The optical fiber cable according to claim 1, wherein each of the plurality of tubes has a diameter in a range of 1.6 mm to 2.0.

4. The optical fiber cable according to claim 1, wherein the binder includes an aramid yarn.

5. The optical fiber cable according to claim 4, wherein the aramid yarn includes a waterproof aramid yarn having a waterproof function and a rigid aramid yarn having superior strength.

6. The optical fiber cable according to claim 1, wherein the sheath has thickness identical to or less than 1.0 mm.

* * * * *